US005570000A

United States Patent [19]
Kowalski

[11] Patent Number: 5,570,000
[45] Date of Patent: Oct. 29, 1996

[54] SOLAR POWERED LIGHT FIXTURE

[76] Inventor: Stanley Kowalski, 2367 NE. 29th St., Lighthouse Point, Fla. 33064

[21] Appl. No.: 292,529

[22] Filed: Aug. 18, 1994

[51] Int. Cl.⁶ .................................. F21L 7/00; H02K 5/00
[52] U.S. Cl. .................................. 322/1; 362/183; 362/31
[58] Field of Search .................... 322/2 R, 1; 362/183

[56] References Cited

U.S. PATENT DOCUMENTS

| | | | |
|---|---|---|---|
| 4,441,143 | 4/1984 | Richardson, Jr. | 362/183 |
| 4,835,664 | 5/1989 | Wen | 362/183 |
| 4,903,172 | 2/1990 | Schöniger et al. | 362/31 |
| 4,989,124 | 1/1991 | Shappell | 362/183 |
| 5,055,984 | 10/1991 | Hung et al. | 362/183 |
| 5,101,329 | 3/1992 | Doyle | 362/183 |
| 5,149,188 | 9/1992 | Robbins | 362/183 |
| 5,196,781 | 3/1993 | Jamieson et al. | 320/61 |
| 5,221,891 | 6/1993 | Janda et al. | 323/350 |
| 5,387,858 | 2/1995 | Bender et al. | 320/61 |

*Primary Examiner*—Steven L. Stephan
*Assistant Examiner*—Nicholas Ponomarenko
*Attorney, Agent, or Firm*—Robert M. Downey, P.A.

[57] ABSTRACT

A lighting assembly for directing light downward onto a surface, the assembly including a shield having two attached plates disposed in angled relation to each other and adapted for mounting above the lighted surface. A solar panel is mounted on the top surface of the shield to convert light energy into electric power for recharging the battery. A photocell is mounted on the top surface of the shield to measure the ambient light and provide the source for switching between the charging and lighting modes.

19 Claims, 1 Drawing Sheet

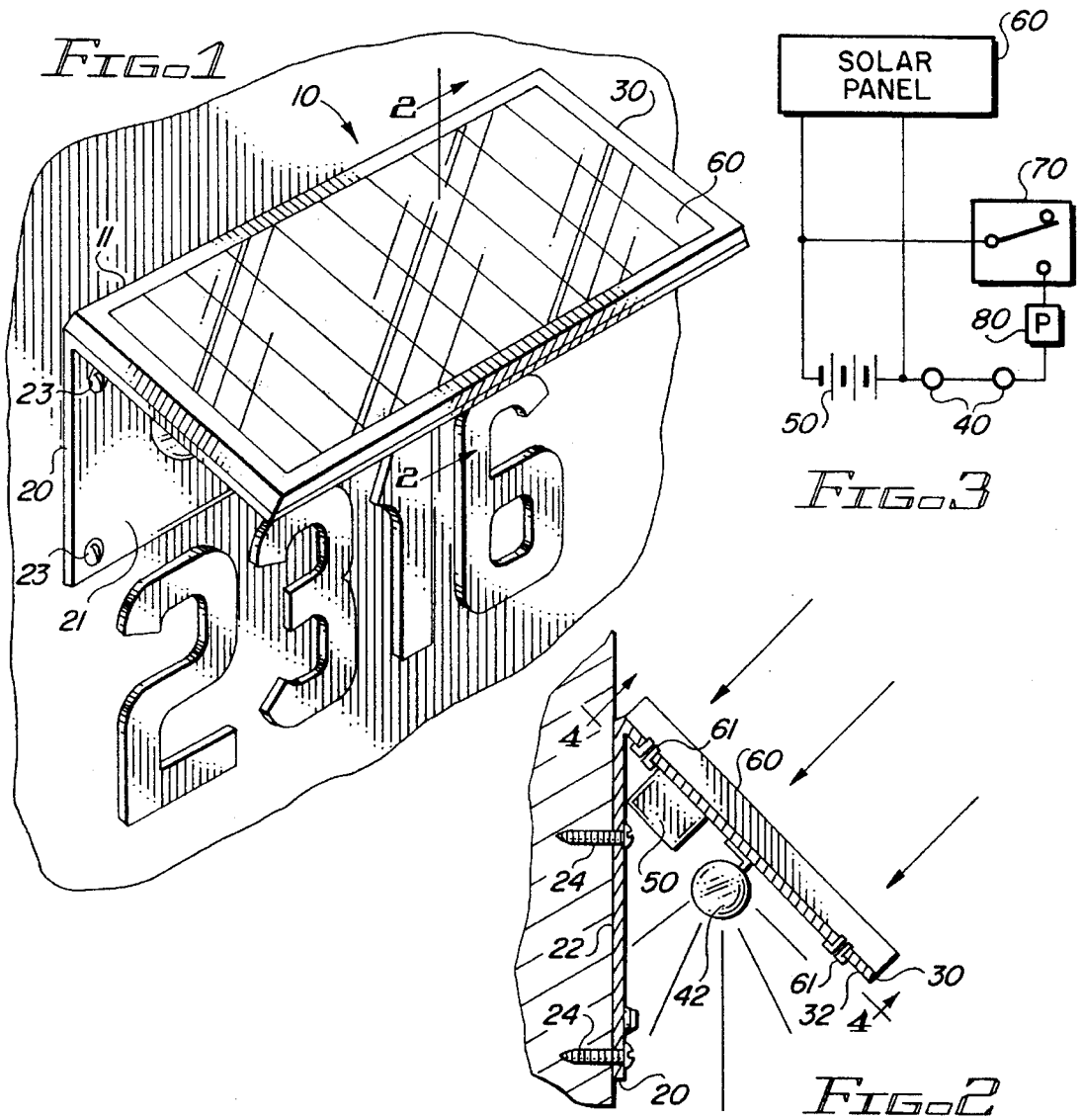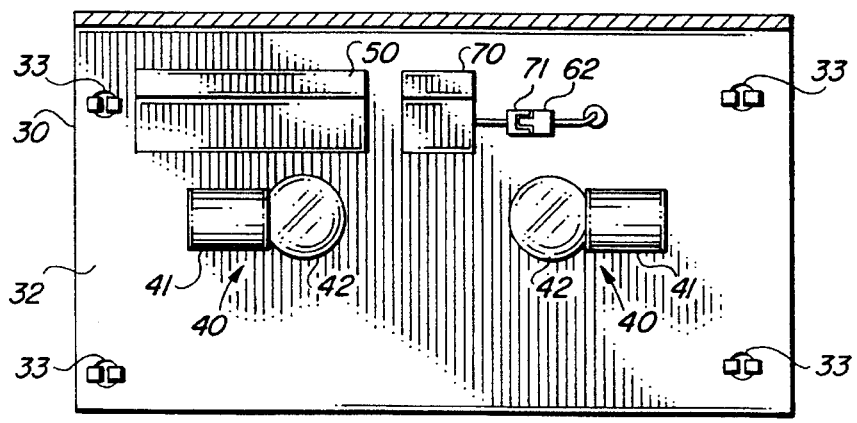

SOLAR POWERED LIGHT FIXTURE

BACKGROUND OF THE INVENTION

1. Field of the Invention

The present invention relates to a lighting assembly, and particularly, to a lighting assembly for directing light downward onto a surface below where the assembly is mounted.

2. Description of the Related Art

Address numbers, such as those commonly used to indicate the number of a house or building, are typically mounted on the outside of the building and are often difficult to see at night. One particular device with a purpose to illuminate house numbers is shown in U.S. Pat. No. 4,903,172. However, this device is a fully self-contained unit adapted for mounting specific types of numbers on the unit and thus cannot be used with existing house numbers. Further, the unit is bulky and unpleasing to the eye and leaves the buyer no option to account for personal taste and aesthetics.

Other devices designed with the purpose of providing illumination outside a house or building include path markers and landscape lights as shown in U.S. Pat No. 5,211,470, U.S. Pat. No. 5,055,984 and U.S. Pat. No. 4,668,120. However, these devices are adapted for illuminating walkways and landscaping and do not provide the capability to be mounted on a surface above existing house numbers to illuminate the numbers.

Applicant's invention is designed specifically to overcome the shortcomings of the prior art by providing for the longstanding need of an aesthetically pleasing lighting assembly which is adapted to be mounted above the surface to be illuminated, allowing the user to choose any type of address numbers, and is capable of providing it's own power.

SUMMARY OF THE INVENTION

The present invention relates to a lighting assembly for directing light downward onto a surface below where the assembly is mounted. The lighting assembly includes primarily a shield having a solar panel, battery, at least one lamp, switch means, and light measuring means mounted thereon. The shield includes two attached plates, one being adapted for mounting on a flat surface and the other angled downward providing a channel to direct the light downward onto the surface below the mounting surface. The solar panel is mounted on the top face of the angled plate and is structured and disposed to absorb light energy and convert it into electric power for recharging the battery. The solar panel may also be mounted in a remote location if the lighting assembly is mounted in an area not exposed to sunlight sufficient to charge the battery. The battery, lamp(s), switch and light measuring means are configured such that during ambient light conditions, the battery is charging and during dark conditions, the battery provides power to the lamps, thereby illuminating the surface below the mounting surface.

With the foregoing in mind, it is an object of the present invention to provide a lighting assembly which directs light downward onto a surface below where the assembly is mounted so that indicia on the surface, such as address numbers, is visible at night.

It is another object of the present invention to provide a lighting assembly which is adapted to absorb light energy and convert it into electric power to power the assembly.

It is a further object of the present invention to provide a lighting assembly with means for measuring ambient light conditions so that the light is operable in darkness and the battery is recharged during light conditions.

It is still a further object of the present invention to provide a lighting assembly adapted for use with existing address numbers to illuminate the numbers at night.

It is another object of the present invention to provide a lighting assembly which is easily mounted to any wall surface above existing address numbers for illuminating the address numbers at night.

These and other objects and advantages of the present invention will become more readily apparent in the description which follows.

BRIEF DESCRIPTION OF THE DRAWINGS

For a fuller understanding of the nature of the present invention, reference should be had to the following detailed description taken in connection with the accompanying drawings in which:

FIG. 1 is a front perspective showing the lighting assembly of the present invention mounted to a wall surface.

FIG. 2 is a cross-sectional view, taken along the line 2—2 of FIG. 1.

FIG. 3 is a circuit diagram illustrating the electrical interconnection of various components of the invention.

FIG. 4 is a bottom plan view of the second plate.

DETAILED DESCRIPTION OF THE PREFERRED EMBODIMENT

With reference to FIGS. 1–4, the present invention is directed to a lighting assembly, generally indicated as 10, including a shield 11 having a first plate member 20 and a second plate member 30 attached and disposed in angled relation to each other. The first plate member 20 includes a front face 21, a rear face 22 and four mounting holes 23 structured to accommodate a fastening device 24 for mounting the lighting assembly to a surface. The second plate member 30 includes a top face 31, a bottom face 32 and at least two mounting holes 33 structured and disposed to accommodate the solar panel 60 grommets 61. The angle between the first plate member 20 and second plate member 30 is structured and disposed such that the second plate member 30 is angled downward when the first plate member 20 is mounted on a vertical surface, thereby creating a gap between the front face 21 of the first plate member 20 and the bottom face 32 of the second plate member 30, structured and disposed to channel light downward onto a surface below the mounting surface.

At least one electric lamp assembly 40 is mounted on the bottom face 32 of the second plate member 30 and includes a lamp socket 41 structured and disposed to support a light bulb 42 and provide power thereto upon completion of an electric circuit to the lamp socket 41.

A power storage source 50 is mounted on the bottom face 32 of the second plate member 30 and is electrically interconnected to the lamp socket 41 for supplying power thereto. In a preferred embodiment the power source includes at least one rechargeable battery.

A solar panel 60, consisting of photovoltaic cells, at least two grommets 61 protruding from the bottom face of the solar panel 60, and an electrical connector 62, is mounted on the top face 31 of the second plate member 30 by locking the grommets 61 into the mounting holes 33. The solar panel 60 is structured and disposed to absorb and convert light energy into electric power for recharging the power storage source 50.

A relay 70 is mounted on the bottom face 32 of the second plate member 30 and is electrically interconnected to the power storage source 50 and lamp socket 41. The relay 70 has an external connector 71 for electrical connection to the solar panel 60 connector 62. The relay 70 is structured to direct electric current flow between the power storage source 50 and the lamp socket 41 or the solar panel 60 and the power storage source 50.

A photocell 80 is mounted on the top face 31 of the second plate member 30 and is electrically interconnected to the relay 70. The photocell 80 measures the ambient light condition and triggers the relay in response to a change between light and dark conditions, thereby controlling the direction of current flow from the power storage source 50 to the lamp socket 41 during dark conditions and from the solar panel 60 to the power storage source 50 during light conditions.

The present invention can be used to illuminate a wide variety of items including house numbers, address indicia and other signs. As long as the item to be illuminated is located below a flat surface to allow mounting of the assembly, virtually any item may be illuminated by the present invention.

Various changes may be made within the spirit and scope of the invention as described above and set forth in the accompanying claims. The number of mounting holes, grommets and lamp assemblies, as well as the exact locations and structure of the mounting holes, grommets, lamp assembly, power storage source, relay and photocell may be modified. Further, the solar panel may be mounted in a remote location if the lighting assembly is mounted in a location not exposed to sunlight sufficient to charge the battery. Also, the size and shape of the shield may vary.

What is claimed is:

1. A lighting assembly comprising:

a shield including a first plate member having a front face and a rear face adapted for mounting engagement against a mounting surface and a second plate member having a top face and a bottom face, said second plate member being disposed in angled relation to said front face of said first plate member so that said front face and said bottom face of said respective first and second plate members channel light downward onto a surface below the mounting surface, at least one electric lamp supported in concealed relation between said front face of said first plate member and said bottom face of said second plate member, said lamp positioned and disposed for directing light downward onto a surface below the mounting surface, a power storage source interconnected to said electric lamp for supplying electric power to said lamp for operation thereof, a solar panel structured and disposed to absorb light energy and convert said light energy into electric power for recharging said power storage source, attachment means for attaching said panel to said top face of said second plate member, said attachment means including at least two grommets protruding from said solar panel and a corresponding number of mounting holes in said second plate member, said grommets being structured and disposed to lock in said lock mounting holes thereby securing said solar panel to said top face of said second plate member, a relay interconnected to said solar panel, said power storage source and said lamp, said relay being structured to direct electric current flow between said power storage source and said lamp and between said solar panel and said power storage source, and a photocell mounted to said shield and being light sensitive, said photocell being interconnected to said relay for actuating said relay in response to a change between light and dark conditions in order to control direction of flow from said power storage source to said lamp during dark conditions and from said solar panel to said power storage source during light conditions.

2. A lighting assembly as recited in claim 1 wherein said photocell is mounted on said top face of said second plate member.

3. A lighting assembly as recited in claim 1 wherein said power storage source is mounted on said bottom face of said second plate member.

4. A lighting assembly as recited in claim 1 wherein said lamp is mounted on said bottom face of said second plate member.

5. A lighting assembly as recited in claim 1 wherein said relay is mounted on said bottom face of said second plate member.

6. A lighting assembly powered by an electric power storage source comprising:

a shield including a first plate member having a front face and a rear face adapted for mounting engagement against a mounting surface and a second plate member having a top face and a bottom face, said second plate member being disposed in angled relation to said front face of said first plate member so that said front face and said bottom face of said respective first and second plate members channel light downward onto a surface below the mounting surface, at least one electric lamp supported in concealed relation between said front face of said first plate member and said bottom face of said second plate member, said lamp positioned and disposed for directing light downward onto a surface below the mounting surface, a solar panel structured and disposed to absorb light energy and convert said light energy into electric power for recharging said power storage source, attachment means for attaching said solar panel to said top face of said second plate member, said attachment means including at least two grommets protruding from said solar panel and a corresponding number of mounting holes in said second plate member, said grommets being structured and disposed to lock in said mounting holes thereby securing said solar panel to said top face of said second plate member, switch means interconnected to said solar panel, said power storage source and said lamp, said switch means being structured to direct electric current flow between said power storage source and said lamp and between said solar panel and said power storage source, and light measuring means mounted to said shield and being light sensitive, said light measuring means being interconnected to said switch means for actuating said switch means in response to a change between light and dark conditions in order to control direction of current flow from said power storage source to said lamp during dark conditions and from said solar panel to said power storage source during light conditions.

7. A lighting assembly as recited in claim 6 wherein said lamp is mounted on said bottom face of said second plate member.

8. A lighting assembly as recited in claim 6 wherein said switch means includes a relay mounted on said bottom face of said second plate member.

9. A lighting assembly as recited in claim 6 wherein said light measuring means includes a photocell mounted on said top face of said second plate member.

10. A lighting assembly comprising:
- a shield including a first plate member having a front face and a rear face adapted for mounting engagement against a mounting surface and a second plate member having a top face and a bottom face, said second plate member being disposed in angled relation to said front face of said first plate member so that said front face and said bottom face of said respective first and second plate members channel light downward onto a surface below the mounting surface,
- at least one electric lamp supported in concealed relation between said front face of said first plate member and said bottom face of said second plate member, said lamp positioned and disposed for directing light downward onto a surface below the mounting surface.

11. A lighting assembly as recited in claim 10 wherein said lamp is mounted on said bottom face of said second plate member.

12. A lighting assembly as recited in claim 10 further including a power source interconnected to said electric lamp for supplying electric power to said lamp for operation thereof.

13. A lighting assembly as recited in claim 12 wherein said power source is mounted on said bottom face of said second plate member.

14. A lighting assembly as recited in claim 12 further including a solar panel structured and disposed to absorb light energy and convert said light energy into electric power for recharging said power source.

15. A lighting assembly as recited in claim 14 further including attachment means for attaching said solar panel to said top face of said second plate member, said attachment means including at least two grommets protruding from said solar panel and a corresponding number of mounting holes in said second plate member, said grommets being structured and disposed to lock in said mounting holes thereby securing said solar panel to said top face of said second plate member.

16. A lighting assembly as recited in claim 14 further including a relay interconnected to said solar panel, said power source and said lamp, said relay being structured to direct electric current flow between said power source and said lamp and between said solar panel and said power source.

17. A lighting assembly as recited in claim 16 wherein said relay is mounted on said bottom face and said second plate member.

18. A lighting assembly as recited in claim 16 further including a photocell, said photocell being interconnected to said relay for actuating said relay in response to a change between light and dark conditions in order to control direction of current flow from said power storage source to said lamp during dark conditions and from said solar panel to said power source during light conditions.

19. A lighting assembly as recited in claim 18 wherein said photocell is mounted on said top face of said second plate member.

* * * * *